United States Patent
Haffner

[11] Patent Number: 5,720,515
[45] Date of Patent: Feb. 24, 1998

[54] VEHICLE SEAT

[75] Inventor: Peter Haffner, Stuttgart, Germany

[73] Assignee: Firma Immanuel Haffner, Stuttgart, Germany

[21] Appl. No.: 652,005

[22] Filed: May 23, 1996

Related U.S. Application Data

[63] Continuation of PCT/EP94/03831, filed on Nov. 19, 1994.

[30] Foreign Application Priority Data

Nov. 25, 1993 [DE] Germany .................. 43 40 189.9

[51] Int. Cl.$^6$ ........................................ A47C 7/62
[52] U.S. Cl. ............. 297/188.04; 297/163; 40/320
[58] Field of Search .................. 297/188.04, 188.01, 297/188.07, 147, 163, 167; 40/320, 324

[56] References Cited

U.S. PATENT DOCUMENTS

| | | | |
|---|---|---|---|
| 2,131,586 | 9/1938 | Dano | 40/320 |
| 2,517,433 | 8/1950 | Hoven | 40/320 |
| 2,711,786 | 6/1955 | Weiss | 40/320 |
| 4,640,033 | 2/1987 | Bulger | 40/320 |
| 5,010,668 | 4/1991 | Zeligson | |
| 5,123,704 | 6/1992 | Peterson | |

FOREIGN PATENT DOCUMENTS

| | | |
|---|---|---|
| 0 277 014 | 8/1988 | European Pat. Off. . |
| 0 492 429 | 7/1992 | European Pat. Off. . |
| 0 563 867 | 10/1993 | European Pat. Off. . |
| 2 626 703 | 8/1989 | France . |
| 2645997 | 10/1990 | France ............... 40/320 |
| 2 650 908 | 2/1991 | France . |
| 2 677 791 | 12/1992 | France . |
| 572654 | 2/1958 | Italy ............... 297/163 |

*Primary Examiner*—Laurie K. Cranmer
*Attorney, Agent, or Firm*—Barry R. Lipsitz; Ralph F. Hoppin

[57] ABSTRACT

A vehicle seat, especially for a public transport vehicle, is provided with a cushion, a backrest, a subframe and a covering for the back of the backrest. In order to provide a passenger with information, especially advertising information, the backrest covering is fitted with an information support in the field of view of the passenger behind the backrest. The information support comprises an attachment and an information support insert. The information support insert provides irremovable, optically recognizable information.

12 Claims, 5 Drawing Sheets

FIG. 9
FIG. 10
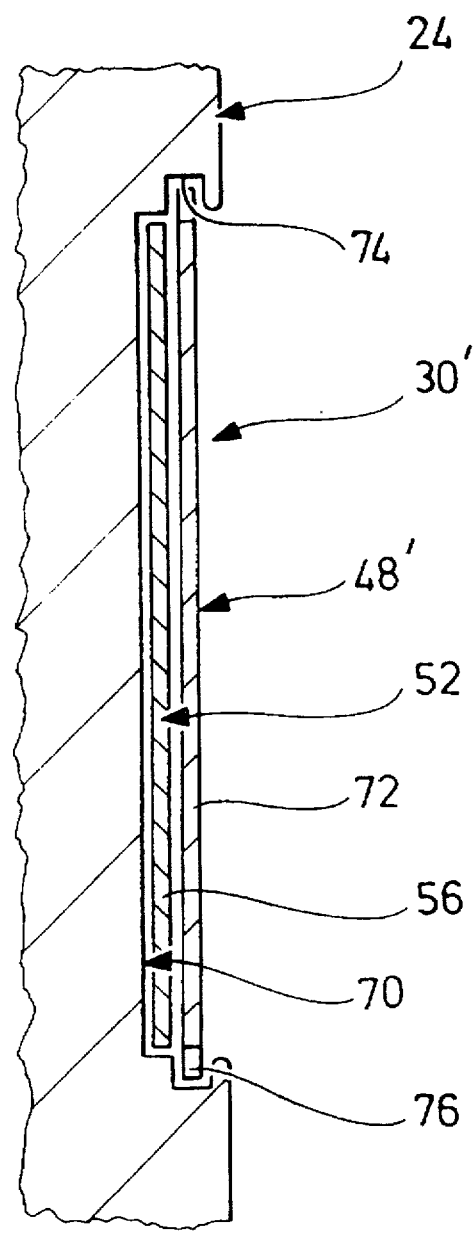
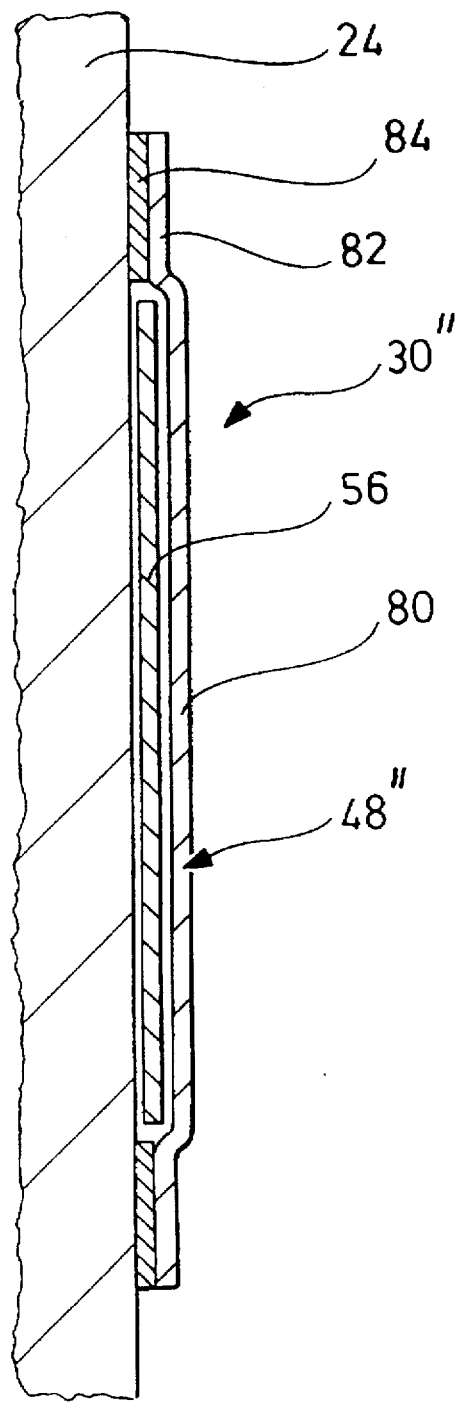

VEHICLE SEAT

This application is a continuation of International PCT Application No. PCT/EP94/03831, filed on Nov. 19, 1994.

BACKGROUND OF THE INVENTION

The invention relates to a seat for a vehicle with a seat cushion, a seat back, a supporting frame as well as a rear-side covering for the seat back.

In the case of means of transport, in particular public means of transport, there is always the problem of passing information on to the passenger.

It is known, for example, to arrange information, particularly advertising information, on the outside of the means of transport or in the ceiling area of it. Such information does, however, have the disadvantage that the passengers are not addressed intensively enough or do not have sufficient time to study the information in detail.

The object underlying the invention is therefore to create an improved possibility of providing the passenger with information, in particular advertising information.

SUMMARY OF THE INVENTION

This object is accomplished in accordance with the invention, in a seat for vehicles, in particular public transport vehicles, of the type described at the outset in that the rear-side covering is provided with an information carrier in the field of vision of a passenger located behind this covering, that the information carrier comprises a receiving means and an information carrier insert and that the information carrier insert presents optically recognizable information immovably fixed on the covering.

The advantage of the inventive solution is to be seen in the fact that due to the arrangement of the information carrier on the covering the passenger located, in particular sitting, behind it has the possibility of studying this information in detail and so the information, in particular the advertising information, makes a lasting impression on the passenger.

The inventive solution is, therefore, especially advantageous for advertising information since this is presented to the passenger for a considerable period of time during the journey.

An additional advantageous variation provides for the information carrier to carry advertising information in a first section and technical information, for example information concerning the means of transport, in a second section.

The information carrier insert is preferably a flat information carrier insert similar to a card which, in the simplest case, is produced from a cardboard material or plastic material.

The information carrier insert can be provided in various ways with optically visible information. It is preferably printed with the optical information.

With respect to the protection of the information carrier insert it has proven to be advantageous when the receiving means has a transparent cover for a visible surface of the information carrier insert.

A particularly advantageous receiving means with respect to the attachment of the inventive information carrier to the covering provides for the cover to be produced from a flexible material.

In this way, a particularly advantageous embodiment can be created by producing the entire receiving means from a flexible material. This is preferably a pocket or sheath made from a foil material, preferably a transparent foil.

The information carrier insert is protected, in particular, from unauthorized removal when it is fixed in the receiving means so as to be non-removable. In the simplest case, this is carried out by encasing, in particular heat-sealing, the insert in the receiving means.

An alternative solution provides for the information carrier insert to be exchangeable, either by means of a correspondingly designed receiving means or by means of fixing the information carrier on the covering in such a manner that this is exchangeable as a whole. This has the advantage that the information can be changed in a simple manner.

In the case of an exchangeable information carrier insert, it has proven to be expedient when the receiving means comprises an inlet opening for the information carrier insert. This inlet opening can be an insertion opening but it can, however, also be accessible due to complete or partial removal of the cover.

In the simplest case, it is provided for the information carrier insert to be insertable into a slit-like insertion opening of the receiving means.

The receiving means itself can be designed in the most varied of ways. It has proven to be particularly advantageous when the receiving means is designed as a pocket or sheath enclosing the information carrier insert.

Alternatively thereto, it is provided for the receiving means to comprise a recess in the covering to accommodate the information carrier insert and a cover, whereby the recess can be closed, in particular, by a removable cover.

In an additional embodiment, it is provided for the receiving means to comprise a cover engaging over the information carrier insert, this cover preferably being connected to the covering so as to be removable.

With respect to the connection of the receiving means to the covering, no further details have been given in conjunction with the previous embodiments. One advantageous embodiment provides, for example, for the receiving means to be connected to the covering via an adhesive layer.

An additional, advantageous embodiment provides for the receiving means to be positively connected to the covering. This is advantageous particularly in the case where the receiving means comprises a recess set into the covering and a cover for closing the recess. In this case, the cover can be positively fixed in position on the covering.

When using an adhesive layer for the connection between the receiving means and the covering it is preferable for the adhesive layer to be formed by a double-sided adhesive tape.

In conjunction with the preceding explanations concerning the individual embodiments, no details have been given concerning the exact arrangement of the information carrier on the covering.

One advantageous embodiment, for example, provides for the information carrier to be arranged on a freely visible surface of the covering.

In the case where the covering is provided with a pulldown table, an additional, advantageous solution of the inventive object provides for the information carrier to be arranged in a region of the covering which can be concealed by a pulldown table comprised by the covering.

Alternatively thereto, it is provided for the information carrier to be arranged on an underside of a pulldown table comprised by the covering.

The advantage of the two cases specified in the above is to be seen in the fact that the passenger either has the possibility of studying the contents of the information carrier in detail when the pulldown table is pulled down or folded away but can also conceal this by way of the corresponding position of the pulldown table.

Additional features and advantages of the invention are the subject matter of the following description as well as the drawings illustrating several embodiments.

BRIEF DESCRIPTION OF THE DRAWINGS

FIG. 9 is a sectional illustration similar to FIG. 7 of a second embodiment of an inventive information carrier and FIG. 10 is a sectional illustration similar to FIG. 7 of a third embodiment of an inventive information carrier.

DETAILED DESCRIPTION OF THE INVENTION

Figure 1:
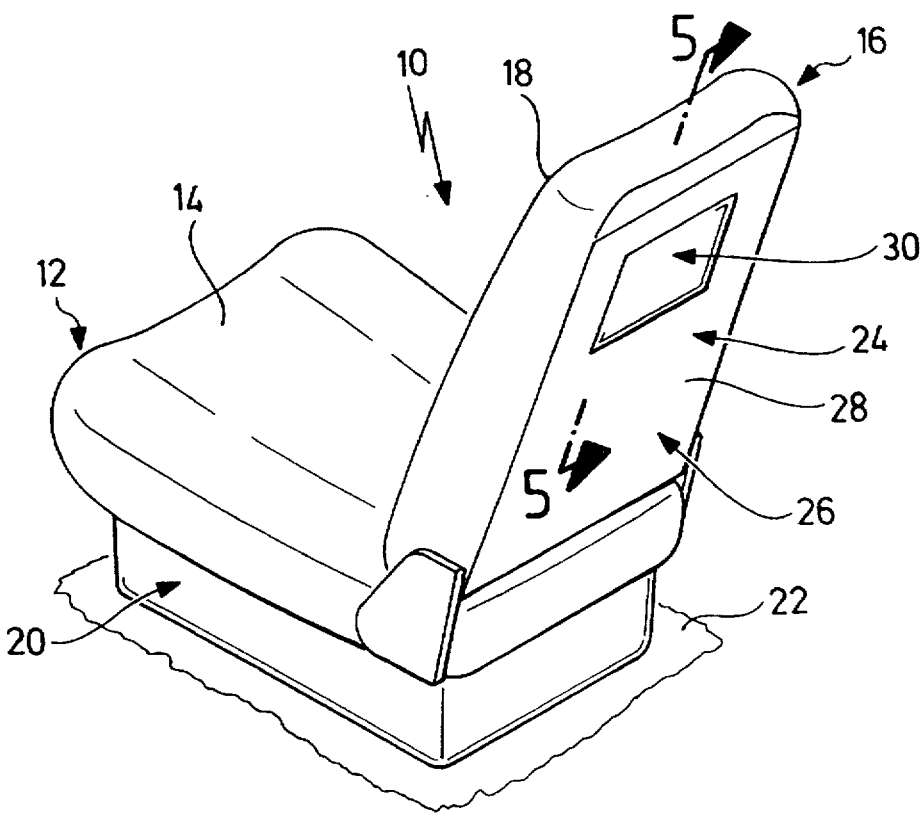
FIG. 1 is a schematic, perspective illustration of an inventive seat in a first embodiment of the inventive solution.

A first embodiment of an inventive seat designated as a whole as 10, in particular a seat for a commercial airplane, comprises a seat cushion 12, which has a seat surface 14, as well as a seat back 16 with a seat back surface 18.

The seat cushion 12 thereby rests on a supporting frame 20, with which the entire seat 10 is supported on a floor surface 22.

The seat back 16 is provided on the side opposite the seat back surface 18 with a rear-side covering 24 which, in the case of the first embodiment, has a covering plate 26 with a surface 28 facing a person located behind the seat 10.

The covering plate 26 thereby bears, preferably in the center in its upper half facing away from the supporting frame 20, an information carrier 30 which is likewise visible to a person located, in particular sitting, behind the seat 10. This information carrier 30 will be described in detail in the following in the form of several embodiments.

Figure 2:
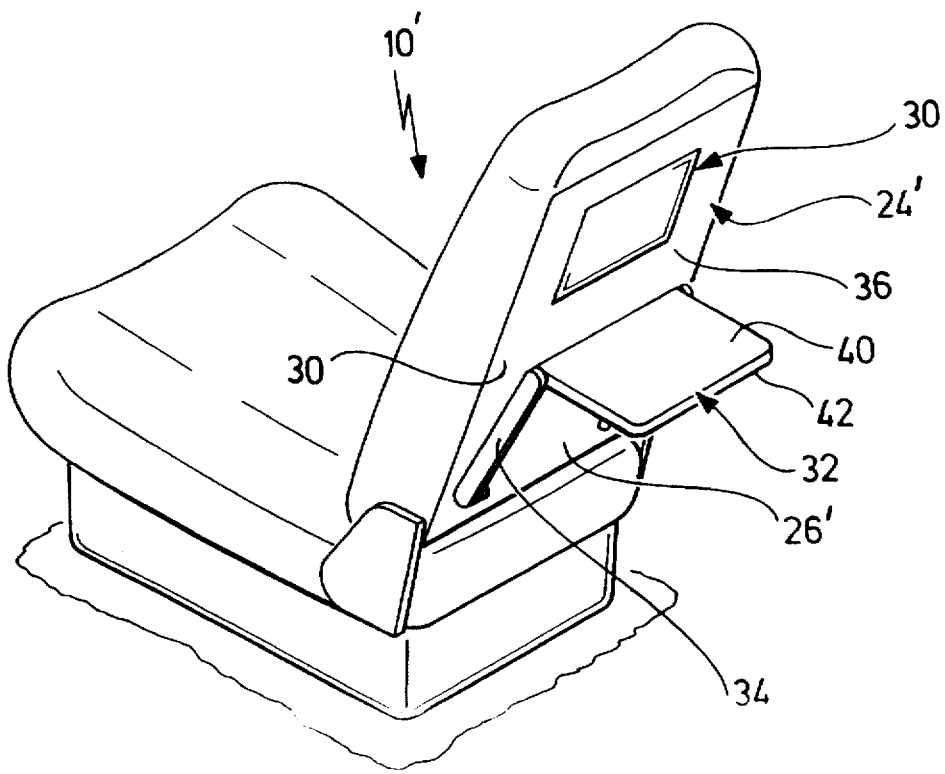
FIG. 2 is an illustration of the seat similar to FIG. 1 in a second embodiment with a pulldown table pulled down.
Figure 3:
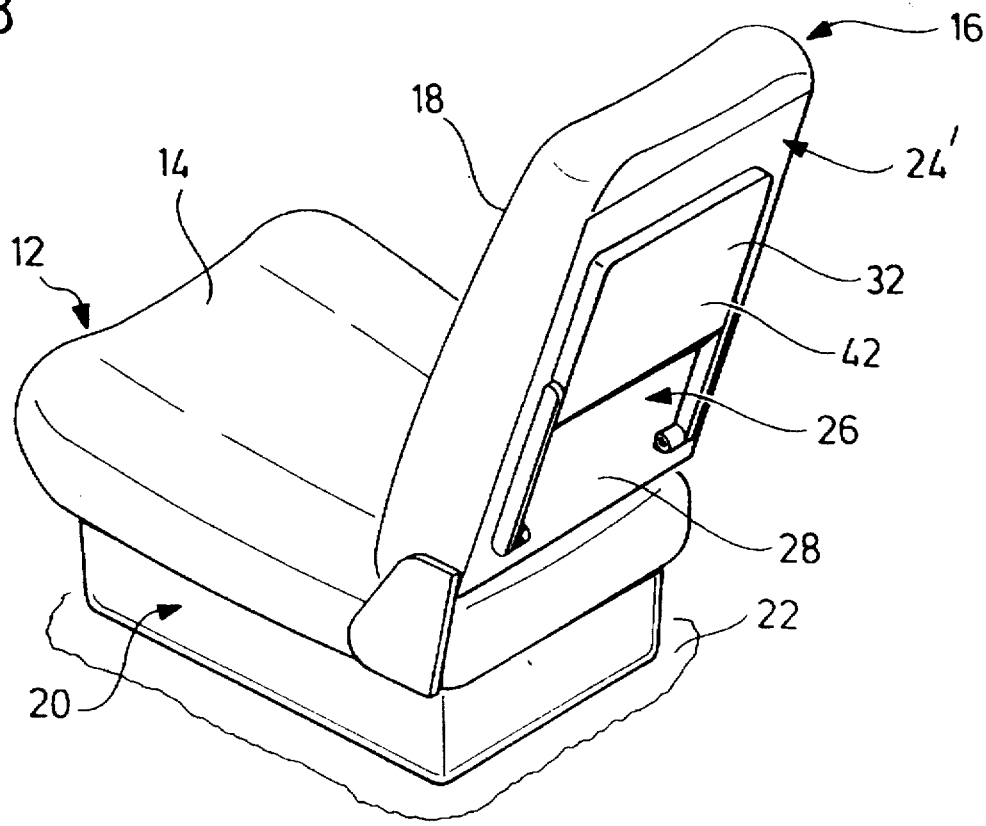
FIG. 3 is an illustration similar to FIG. 2 of the second embodiment with a pulldown table folded away.

In a second embodiment of an inventive seat, designated as a whole as 10', the covering 24' comprises a covering plate 26' with a pulldown table 32 which is articulatedly connected to the covering plate 26' via arms 34, the pulldown table 32 being tiltable between a pulled down position, illustrated in FIG. 2, and a folded away position, illustrated in FIG. 3. In order to accommodate the pulldown table 32 in its folded away position, the covering plate 26' is provided with a recessed region 36, in which the pulldown table 32 is located in its folded away position illustrated in FIG. 3.

The recessed region 36 has, for its part, a surface 38 which faces a person using the pulldown table 32 when the pulldown table 32 is in the pulled down position and in the folded away position of the pulldown table 32 faces an upper side 40 of the pulldown table so that in this position the underside 42 of the pulldown table 32 faces the person located behind the seat 10'.

In the second embodiment 10' of the inventive seat, the information carrier 30 is arranged on the surface 38 of the region 36 and likewise advantageously in an upper half thereof.

With respect to additional features, reference is made in full to the first embodiment and the same reference numerals as for the first embodiment are also used for the identical elements.

Figure 4:
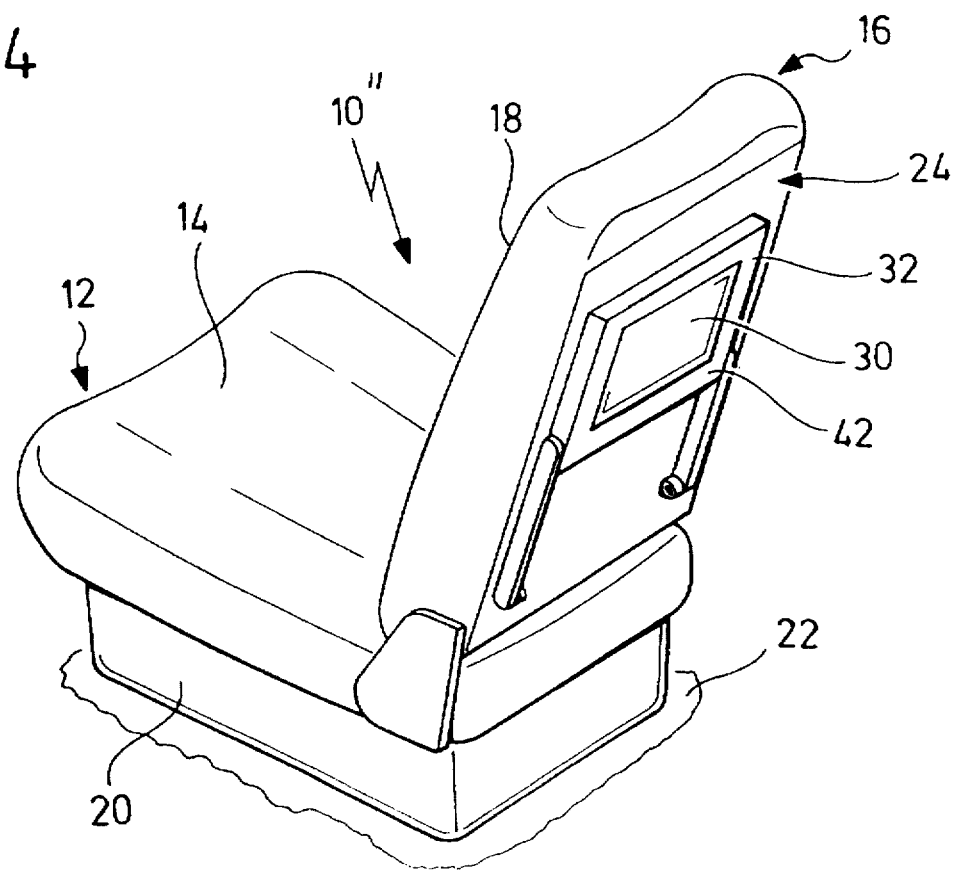
FIG. 4 is an illustration similar to FIG. 1 of a third embodiment.

In a third embodiment of an inventive seat 10", illustrated in FIG. 4, the information carrier 30 is not arranged in the recess 36 but on the underside 42 of the pulldown table 32 so that the information carrier is visible in the folded away state of the pulldown table 32.

With respect to the additional features, reference is made in full to the explanations concerning the first and second embodiments, the same elements having the same reference numerals.

Figure 5:
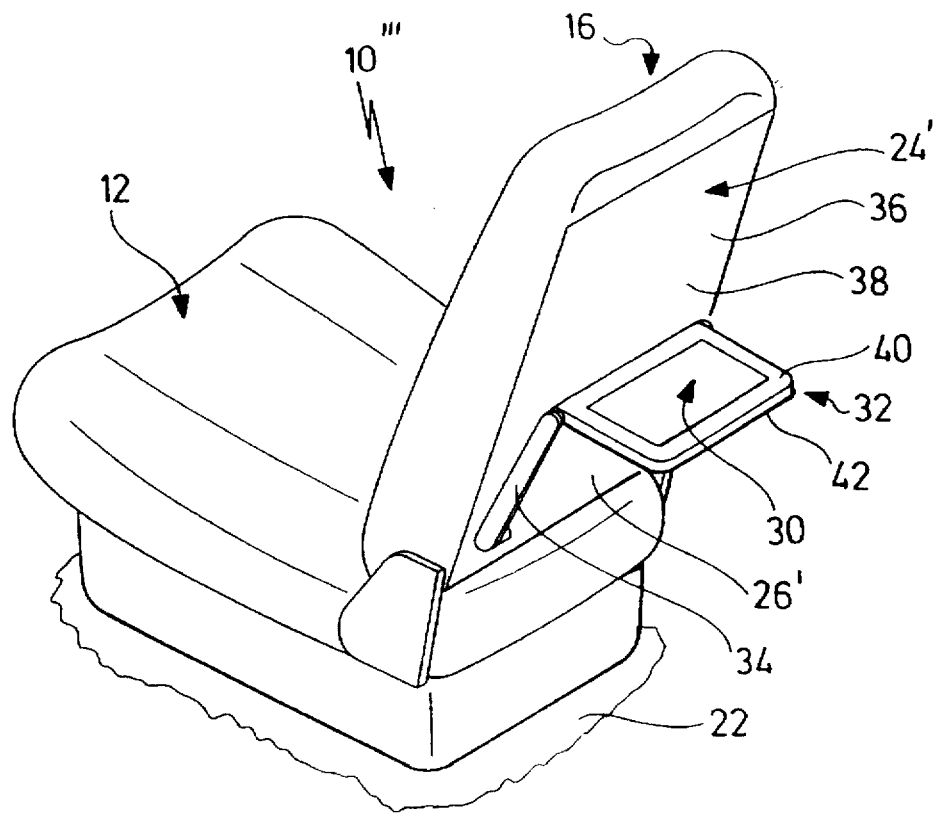
FIG. 5 is an illustration similar to FIG. 1 of a fourth embodiment.

In a fourth embodiment of an inventive seat 10''', illustrated in FIG. 5, the information carrier 30 is, in contrast to the third embodiment, not arranged on the underside 42 but on the upper side 40 of the pulldown table and is therefore visible in the pulled down state of the pulldown table.

For all the remaining features of the fourth embodiment, the same reference numerals as in the preceding embodiments are used and so reference can also be made in full to the explanations concerning these embodiments.

Figure 6:
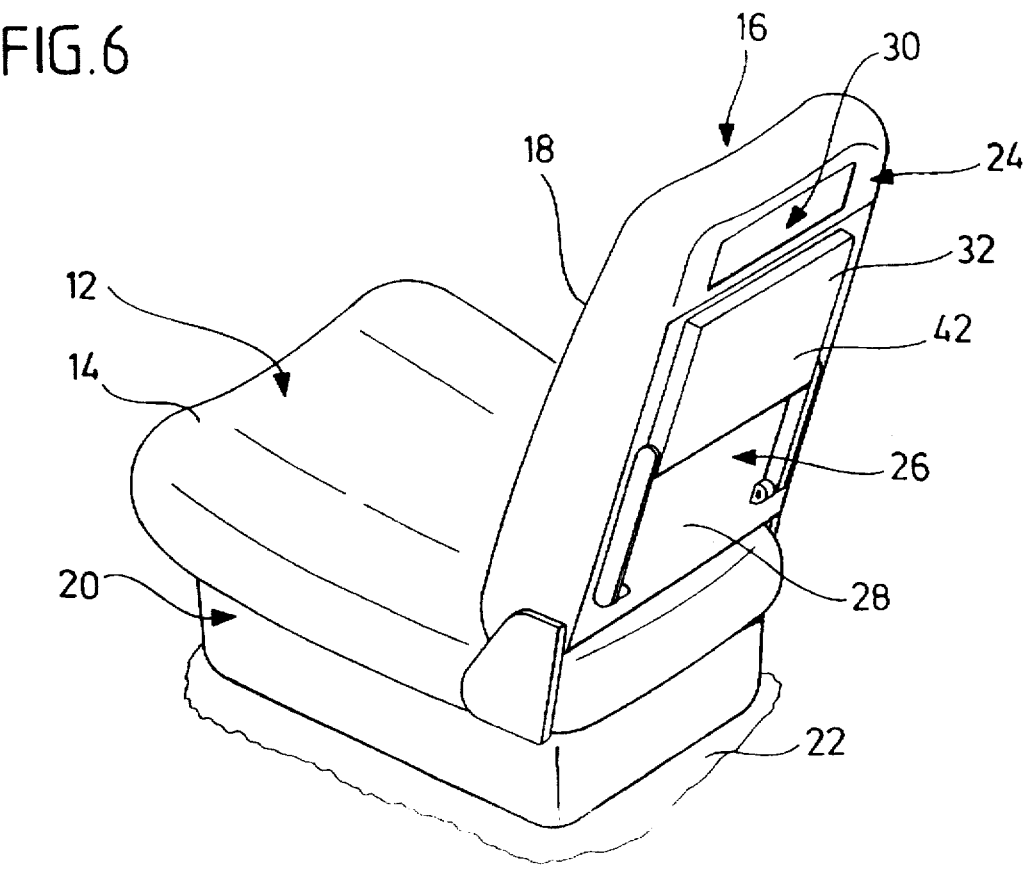
FIG. 6 is an illustration similar to FIG. 1 of a fifth embodiment.

In a fifth embodiment illustrated in FIG. 6 of an inventive seat 10'''', the information carrier 30 is arranged on the covering 24', namely above the pulldown table 32 in its folded away position, so that the information carrier 30 is visible in all positions of the pulldown table 32.

The information carrier is preferably arranged in the area immediately above the pulldown table 32 in its folded away position.

The same reference numerals as in the preceding embodiments have been used to designate the remaining features and so reference can be made to the corresponding passages in the description.

Figure 7:
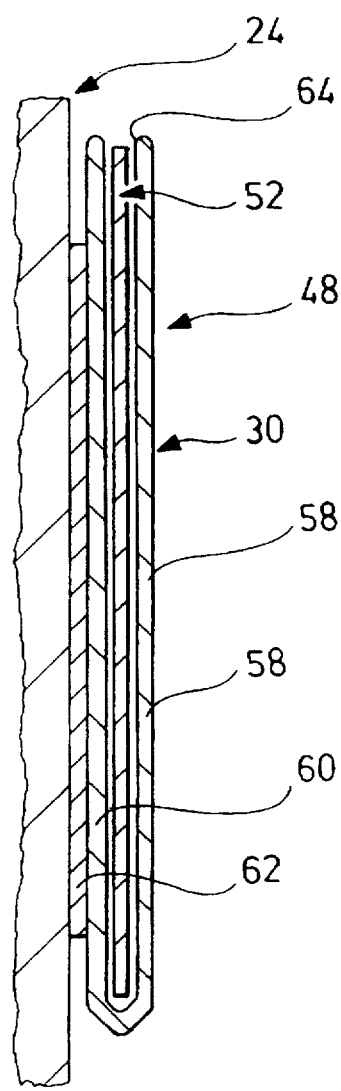
FIG. 7 is a section along line 5—5 in FIG. 1 through one of the embodiments of the seat in the region of the information carrier with a first embodiment of an inventive information carrier.
Figure 8:
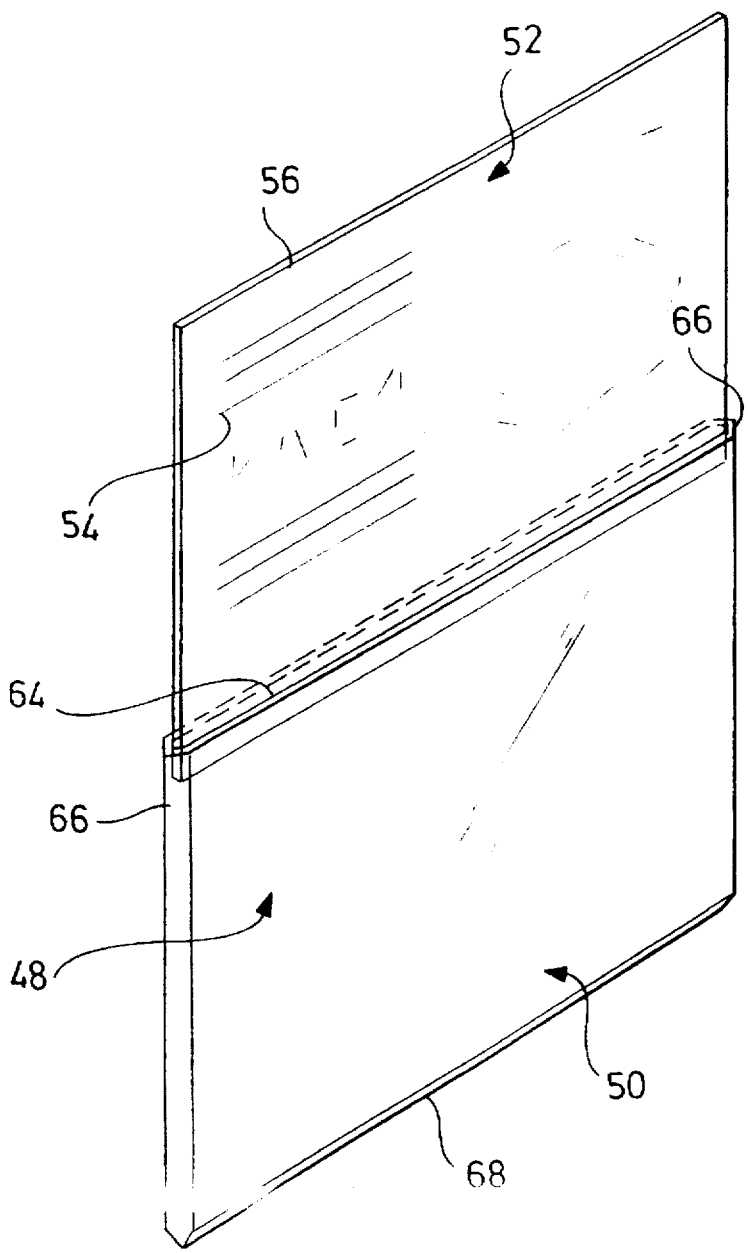
FIG. 8 is a perspective illustration of the first embodiment of the inventive information carrier with an information carrier insert partially withdrawn.

A first embodiment of the information carrier designated as a whole as 30 comprises, as illustrated in FIGS. 7 and 8, a receiving means 48 designed as a sheath 50 for an information carrier insert which is designated as a whole as 52, is provided, for example, on a visible surface 54 with printed advertising information or information of a different kind and is designed as an insert card 56 made of cardboard for the sheath 50. The sheath 50 comprises, for its part, a transparent sheath wall 58 facing away from the covering 24 and a supporting wall 60 which is, for example, connected to the covering 24, i.e. the surface 28, or the recessed surface 38 or the underside 42 of the pulldown table 32 by adhesion via a double-sided adhesive strip 62.

For the purpose of exchanging the insert card 56, the sheath 50 is also provided with an insertion opening 64, the edges of which are formed by edges of the supporting wall 60 and edges of the sheath wall 58, these being connected with one another, for example, on both sides of the insertion opening 64 by means of weld seams 66 and likewise, in addition, by a bottom weld seam 68 which extends in spaced relation parallel to the insertion opening 64 and secures the insert card 56 against falling out downwards.

Alternatively thereto, it is also expedient for the insert card 56 to be heat-sealed into the sheath 50 by heat-sealing the edges of the supporting wall 60 and the sheath wall 58 on all sides.

If the first embodiment of the information carrier 30 is used with the seat according to the fourth embodiment, the sheath 50 preferably extends over the entire upper side 40 of the pulldown table 32.

In a second embodiment of an inventive information carrier 30', illustrated in FIG. 9, the information carrier insert 52 is likewise designed as an insert card 56, the receiving means 48' is, however, formed not by the sheath 50 but, on the one hand, by a recess 70 which is set into the covering 24, i.e. the respective surface thereof supporting the information carrier 30', and, on the other hand, is closed by a transparent cover plate 72. The cover plate 72 is preferably held positively on the covering 24 by projections engaging in recesses 74, the recesses 74 being arranged, for example, in the covering 24 and the projections 76 on the cover plate 72 but it can also be the other way around.

The cover plate 72 preferably engages over the insert card 56 completely so that its visible surface 54 can be seen through the transparent cover plate 72.

This second embodiment of the information carrier 30' is, for example, advantageous with the fourth embodiment of the seat when the information carrier 30 extends only over a section of the upper side 40 of the pulldown table 32.

In a third embodiment 30" of an inventive information carrier, illustrated in FIG. 10, the information carrier insert 52 is merely placed against the respective side of the covering 24 and is fixed in position by having a transparent cover element 80 engaging over it, this cover element protruding beyond the edges of the insert card 56 on all sides and being connected to the covering 24 with its protruding edge regions 82, preferably via an adhesive layer 84, so that the cover element forms the receiving means 48" together with the side of the covering 24 serving as contact.

What is claimed is:

1. A seat for a public transport vehicle, comprising:

a seat cushion, a seat back, a supporting frame and a rear-side covering for the seat back;

said rear-side covering being provided with an information carrier in the field of vision of a passenger located behind said covering;

said information carrier comprising a receiving means adapted to receive an information carrier insert;

said receiving means having a transparent cover made from a flexible transparent material for a visible surface of the information carrier insert and being designed as a pocket surrounding the information carrier insert;

said entire pocket being made from a flexible material, and said pocket adapted to be connected to said covering via a releasable element arranged between said pocket and said covering; and said information carrier insert being a flat card which is printed with optically recognizable information.

2. A seat as defined in claim 1, wherein:

the information carrier insert is non-removably fixed within said pocket by sealing said pocket on all sides.

3. A seat as defined in claim 1, wherein:

said pocket is sealed on all sides by heat-sealing said flexible transparent material at a perimeter thereof.

4. A seat as defined in claim 1, wherein:

the information carrier insert is held in the pocket so as to be exchangeable.

5. A seat as defined in claim 4, wherein:

the information carrier insert is insertable into an opening slit of the receiving means.

6. A seat as defined in claim 1, wherein:

said releasable element extends adjacent to a supporting wall of said pocket and a side of said rear-side covering which faces said supporting wall.

7. A seat as defined in claim 6, wherein:

said releasable element comprises an adhesive layer which is interposed between said supporting wall of said pocket and said side of said rear-side covering which faces said supporting wall.

8. A seat as defined in claim 6, wherein:

said releasable element comprises an adhering agent fixing said pocket to said covering.

9. A seat as defined in claim 1, wherein:

the information carrier is arranged on a freely visible surface of the covering.

10. A seat as defined in claim 1, wherein:

the information carrier is arranged in a region of the covering which is adapted to be concealed by a pulldown table of the seat.

11. A seat for a public transport vehicle, comprising:

a seat cushion, a seat back, a supporting frame and a rear-side covering for the seat back;

said rear-side covering being provided with an information carrier which is arranged in a region of the covering which is concealed by a pulldown table of the seat, said information carrier being in the field of vision of a passenger located behind said covering;

said information carrier comprising a receiving means and an information carrier insert;

said receiving means having a transparent cover made of a flexible material for a visible surface of the information carrier insert;

said information carrier insert being a flat card which is printed with optically recognizable information.

12. A seat for a public transport vehicle, comprising:

a seat cushion, a seat back, a supporting frame, a rear-side covering for the seat back, and a pulldown table;

an information carrier arranged on a side of said pulldown table in the field of vision of a passenger located behind said covering;

said information carrier comprising a receiving means adapted to receive an information carrier insert;

said receiving means having a transparent cover made from a flexible transparent material for a visible surface of the information carrier insert and being designed as a pocket surrounding the information carrier insert;

said entire pocket being made from a flexible material and being adapted to be connected to said side of said pulldown table via a releasable element arranged between said pocket and said side of said pulldown table; and said information carrier insert being a flat card which is printed with optically recognizable information.

\* \* \* \* \*